Patented Apr. 7, 1953

2,634,227

UNITED STATES PATENT OFFICE 2,634,227

INSECTICIDAL UNSYMMETRICAL DIETHYL DIPHENYL PYROPHOSPHATE

Gennady M. Kosolapoff, Auburn, Ala., assignor to Monsanto Chemical Company, St. Louis, Mo., a corporation of Delaware No Drawing. Application June 3, 1949, Serial No. 97,076

3 Claims. (Cl. 167—22)

This invention provides a new ester of pyrophosphoric acid, namely, unsym. diethyl diphenyl pyrophosphate. The formula of my new compound is:

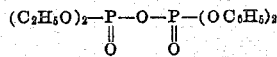

$(C_2H_5O)_2-\underset{\underset{O}{\|}}{P}-O-\underset{\underset{O}{\|}}{P}-(OC_6H_5)_2$ The present compound has been found to be soluble in petroleum or aromatic hydrocarbon oils of the type generally used as insecticide carriers and also to possess a pronounced insecticidal activity.

For the purpose of employing the present compound as an insecticide, it may be combined with a carrier, such as a dust, an aliphatic or aromatic hydrocarbon oil solvent, or an aqueous emulsion, and in this form applied to insects.

The present compound may be prepared by the reaction between diphenyl chlorophosphate and triethyl phosphate, a reaction in which evolution of ethyl chloride occurs. The reaction takes place between equal molar proportions of diphenyl chlorophosphate and triethyl phosphate, forming the present compound and liberating ethyl chloride. The reaction is best carried out by mixing together the above-mentioned starting materials, it being desirable generally to employ the triethyl phosphate in somewhat of an excess. The excess triethyl phosphate is distilled out of the reaction mixture at the conclusion of the reaction. The reaction taking place may be written as follows:

$(C_2H_5O)_3-PO + (C_6H_5O)_2POCl \longrightarrow$
$(C_2H_5O)_2-\underset{\underset{O}{\|}}{P}-O-\underset{\underset{O}{\|}}{P}-(OC_6H_5)_2 + C_2H_5Cl$ The process is illustrated by the following example:

EXAMPLE

*Unsym. diethyl diphenyl pyrophosphate.*—A mixture of 0.176 mole of diphenyl chlorophosphate (47.3 g.) and one mole of triethyl phosphate (182 g.) was refluxed at a temperature of 140° C. for 17 hours. The reaction mixture was then heated under vacuum up to a pot temperature of 160° C., whereby excess triethyl phosphate was distilled out of the reaction mixture. The residue was substantially free of chloride ion, indicating absence of unreacted starting material. Phosphorus, found 15.2%, theory, 16.0%.

The compound of the present invention may be formulated into insecticidal compositions in any desired form, for example, as dusts, as aqueous emulsions or oil solutions. For application to insect infested vegetation, the present compound is combined with a carrier, such as an aliphatic hydrocarbon oil boiling between 370° F. and 510° F. in an amount such as to produce a solution containing from 0.5% to 10% or more by weight. If desired, the solution so formed may be further diluted to produce dilute solutions wherein the concentration of active pyrophosphate ester ranges from 25 to 500 parts per million.

The present compound applied to the aphid, *Myzus porosus* gave the following percent kill at the indicated concentrations:

*Percent kill of Myzus porosus at parts per million concentration*

| 100 | 50 | 25 |
|---|---|---|
| 97.6 | 87.9 | 71.8 |

In the above test, solutions of the indicated concentration of the present compound were applied to the insect by means of an atomizer-type spray. However, water solutions or hydrocarbon-water emulsions may also be employed for the present purpose. When preparing water-oil emulsions, it is generally desirable to incorporate a wetting or emulsifying agent in the emulsion or solution. A suitable wetting or emulsifying agent may be sodium dodecylbenzensulfonate to aid in forming the emulsion or solution, and also to wet the insects or vegetation upon which the spray is applied.

The present compound is soluble is mixed aromatic-aliphatic hydrocarbon oils. Concentrated solutions containing high proportions of the ester, namely, from 10% to 50% or more by weight may be prepared. Such concentrated solutions are conveniently employed in the preparation of more dilute solutions or water-oil emulsions of the ester which are suitable for insect spraying purposes.

What I claim is:

1. Unsym. diethyl diphenyl pyrophosphate.
2. An insecticidal composition comprising unsym. diethyl diphenyl pyrophosphate as the essential active ingredient combined with an insecticide carrier.

3. An insecticidal composition comprising unsym. diethyl diphenyl pyrophosphate as the essential active ingredient dissolved in a liquid hydrocarbon carrier.

GENNADY M. KOSOLAPOFF.

REFERENCES CITED

The following references are of record in the file of this patent:

UNITED STATES PATENTS

| Number | Name | Date |
|---|---|---|
| 2,402,703 | Woodstock | June 25, 1946 |
| 2,486,658 | Kosolapoff | Nov. 1, 1949 |
| 2,495,220 | Bell | Jan. 24, 1950 |

OTHER REFERENCES

Manufacturing Chemist and Manufacturing Perfumer, November 1947, Volume XVIII, Number 11, page 506.